United States Patent [19]

Baldwin

[11] Patent Number: 4,841,664
[45] Date of Patent: Jun. 27, 1989

[54] FISH LURE

[76] Inventor: Robert J. Baldwin, 61 Skyline Ct., 3700 NE. Indian River Dr., Jensen Beach, Fla. 34957

[21] Appl. No.: 85,350

[22] Filed: Aug. 14, 1987

[51] Int. Cl.$^4$ ............................................. A01K 97/08
[52] U.S. Cl. ...................................... 43/41; 43/43.1; 43/42.74; 43/42.36
[58] Field of Search ................... 43/41, 42.06, 43.1, 43/42.74, 42.49, 42.36, 44.99, 42.08, 42.23

[56] References Cited

U.S. PATENT DOCUMENTS

| | | | |
|---|---|---|---|
| 1,814,450 | 7/1931 | Nelson . | |
| 2,467,971 | 4/1949 | Frair | 43/41 |
| 2,518,593 | 8/1950 | Bell | 43/44.2 |
| 2,556,634 | 6/1951 | Redinger | 43/41 |
| 2,582,646 | 1/1952 | Moore | 43/44.2 |
| 2,724,206 | 11/1955 | Miller | 43/43.1 |
| 2,735,214 | 2/1956 | Stenseng | 43/44.4 |
| 2,811,805 | 11/1957 | McGee | 43/43.1 |
| 2,972,831 | 2/1961 | Anselmi | 43/44.4 |
| 3,183,620 | 5/1965 | Dockal | 43/42.74 |
| 3,184,879 | 5/1965 | Ruhl | 43/42.74 |
| 3,293,791 | 12/1966 | Hinkson | 43/44.4 |
| 3,760,529 | 9/1973 | Hicks | 43/41 |
| 3,893,255 | 7/1975 | Hicks | 43/41 |
| 3,914,896 | 10/1975 | Sahagian | 43/44.6 |
| 4,021,959 | 5/1977 | Antkowiak | 43/41 |
| 4,520,588 | 6/1985 | Hindermyer | 43/42.36 |
| 4,554,756 | 11/1985 | Thomas | 43/44.99 |

FOREIGN PATENT DOCUMENTS 1094372 5/1955 France ...................... 43/44.99

Primary Examiner—Kurt Rowan
Attorney, Agent, or Firm—Thomas A. Lennox

[57] ABSTRACT

A fishing lure is provided including a hollow tubular shape that may be molded in the shape of a fish having a continuous side wall, a rounded closure in front and a closable rear opening, wherein the container is generally transparent or at least sufficiently translucent and lightly colored to allow viewing of live bait inside the container. A plurality of holes, one through the center of the front wall and one through the center of the rear closure with at least a pair of holes along the continuous side wall allows leader line to be trained into the front, out through the side wall, back through the side wall and out through the rear wall for attachment of hooks and various further fish luring devices. Also disclosed is a fish lure comprising a spherical transparent hollow ball having a thread closure between the mating halves of the sphere and a plurality of holes opening into the interior of the sphere to allow free flow of water in and out of the container allowing fishing luring live bait to swim unmolested inside the sphere.

13 Claims, 3 Drawing Sheets

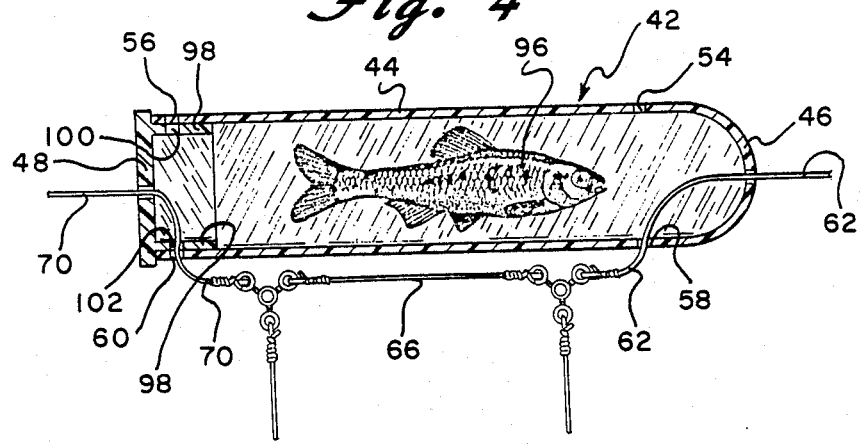
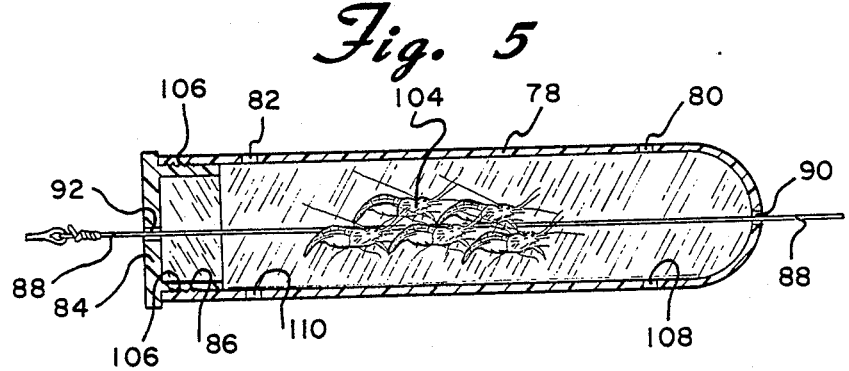
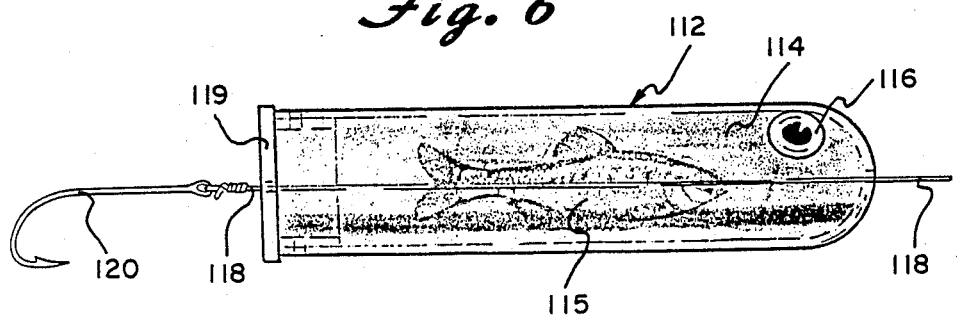

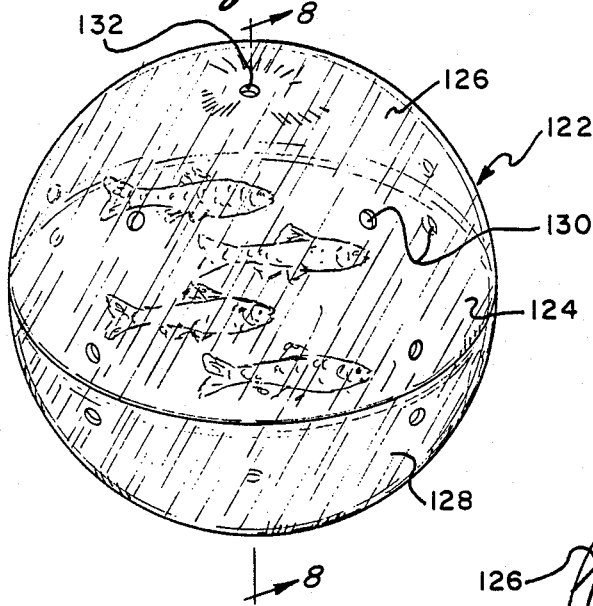
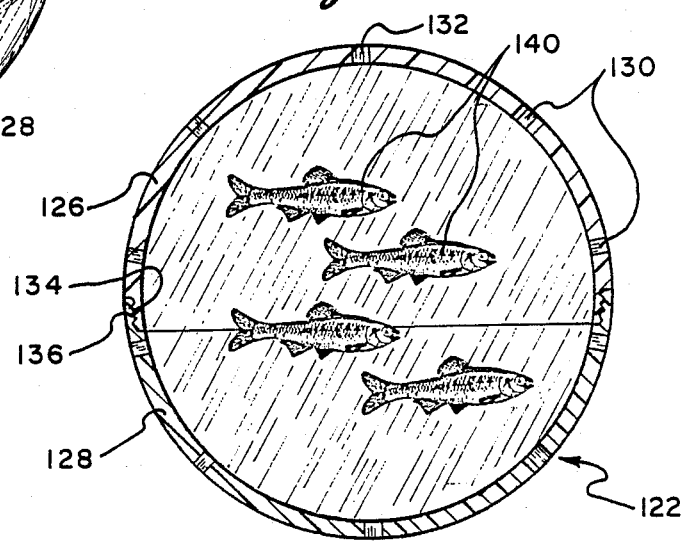
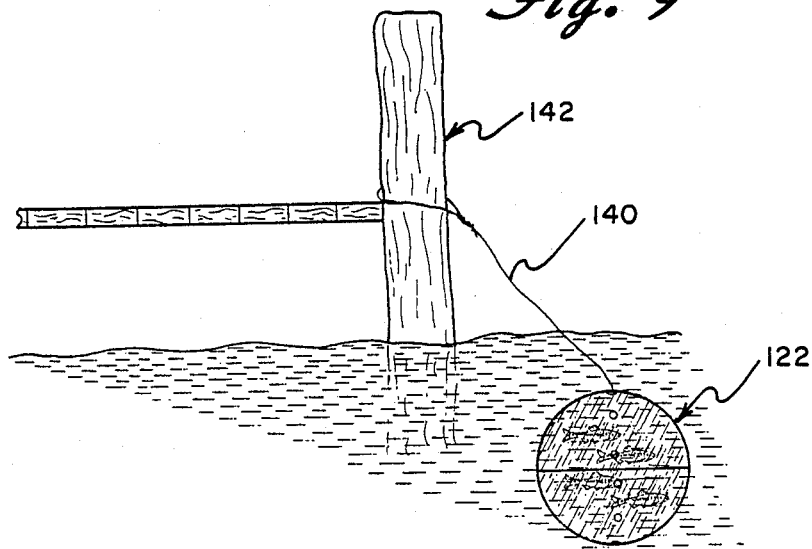

FISH LURE

BACKGROUND OF THE INVENTION

This invention involves a fish lure which houses live bait and allows the game fish to view the live bait through the walls of the lure. This invention more particularly relates to a fishing lure which is attached through a leader to a line and reel held by the game fisherman which includes a tubular shaped container housing live bait which is attached at least one hook.

It is well recognized the most effective lure for most fishing and in particular salt water fishing is live bait. Although many brightly colored and shiny devices are employed to attract the fish from a distance, the most effective lure as the fish approaches is live bait. The movement, odor and appearance of live bait cannot be effectively duplicated by any synthetic means. Live bait is costly and under many fishing conditions, the live bait lives only a short time after which its effectiveness is greatly diminished. Further, it is unusual for the live bait to live through the strike of a game fish. Even if the game fish is caught, the live bait is usually destroyed in the process of bringing the fish to the boat or the shore. A number of devices have been provided and are employed to hold the live bait in position on the lure in proximity to hooks to engage the game fish. These devices either thread a hook or wire through the fish or in some way grip the fish to the lure. This process weakens the bait, kills it in a short time or still allows it to be mangled when the game fish strikes the lure.

None of the devices provided in the prior art satisfy the above needs of holding the live bait in sufficient proximity to the hook under conditions wherein the sight and smell of the live bait can be taken advantage of and yet protect the live bait from the fish strike nor attain the objects hereinbelow.

SUMMARY OF THE INVENTION

An object of this invetion is to provide a fishing lure which will hold live bait in the proximity of at least one hook or a plurality of hooks so that when the game fish strikes at the live bait, they will be hooked.

It is a further object of the present invention to provide a fish lure which will protect the live bait even though it is subjected to multiple strikes by a game fish.

It is an additional object of the present to provide a fishing lure which will pull the live bait in water under conditions where the live bait will be protected for periods of time whether being in the water or even in the boat or on land.

It is a further object of present invention to provide a fishing lure which can be provided in a multiplicity of colors, patterns and designs which will further attract the game fish and yet allow the live bait to be viewed and smelled by the game fish when it approaches the lure.

It is a further object of the present invention to provide a fishing lure which will house the live bait but will also allow the attachment of multiple hooks and luring devices trailing from the side or the rear of the lure.

It is an additional object of the present invention to provide a fishing lure with a container to house the live bait protecting it from the strike of a game fish, but also provide a water flow through the container housing to deliver oxygen to the live bait and prolong its life.

My invention is a fish lure comprising a container having a wall of a material of sufficient translucency that the contents of the container may be viewed from the outside. It is preferred that the wall of the container be transparent, but it may be colored of various hues and marked with various designs so long as the translucency, color or designs do not entirely obstruct the view of the live bait inside the container. A closure device is provided to allow the container to be opened and reclosed after the live bait has been inserted into the container. A plurality of holes through the wall opens the interior of the container to the outside and an attachment device is provided to train the lure into the water containing game fish and to retrieve it as desired.

My preferred invention is a fishing lure comprising a tubular shaped container having a continuous side wall, a closed front wall, and a rear opening wherein the container is constructed of a material that is sufficiently translucent that the interior of the container can be viewed from the outside. The fishing lure further includes a detachable rear closure member to detachably close the rear wall. The fishing lure further includes a plurality of holes through the combination of the container and the rear closure member comprising a first hole through the center of the front wall and a second hole through the center of the rear closure member, these holes being positioned proximate to the longitudinal center line of the tubular shaped container.

BRIEF DESCRIPTION OF THE DRAWINGS

FIG. 4 is a cross-sectional view taken along lines 4—4 of FIG. 2.

FIG. 5 is a cross-sectional view taken along lines 5—5 of FIG. 3.

FIG. 6 is a planar view of a third embodiment of the present invention.

FIG. 7 is a perspective view of a fourth embodiment of the present invention.

FIG. 8 is a cross-sectional view taken along lines 8—8 of FIG. 7.

FIG. 9 is a diagram illustrating the training of the device illustrated in FIG. 7 from a dock into the water.

DESCRIPTION OF PREFERRED EMBODIMENTS

Figure 1:
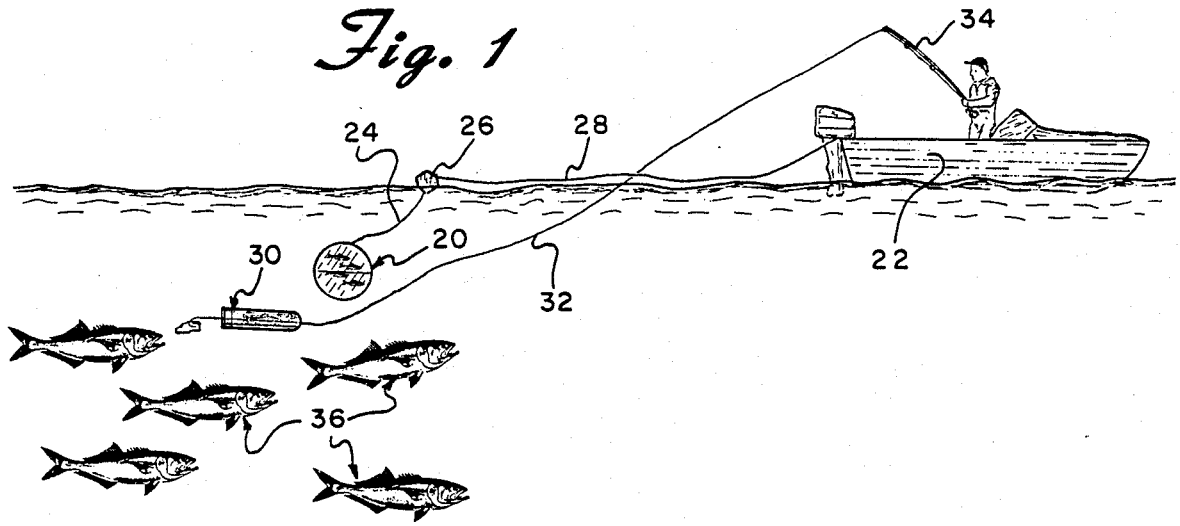
FIG. 1 is a diagram illustrating the use of two embodiments of the fishing lure of the present invention being trailed behind a boat into a school of game fish.

The use of the fish lure of the present invention includes an attachment device to train the lure into the water containing game fish and to allow retrieval of the lure as desired. Typically, this attachment device is a fishing line attached to a rod and reel which is attached to a fishing reel of the present invention.

It is preferred that the side wall and also preferably the closed front wall be transparent and further be composed of a polymeric plastic material. The transparent material may be tinted or colored and it is preferred that if colored that it remain transparent. A colorant or material imparting translucency to the polymeric plastic may be included, but the plastic should be sufficiently translucent so that live bait inside the container may be easily viewed by the game fish. Suitable plastic polymeric material include polymethyl methacrylate, polycarbonate, polystyrene and like polymeric materials which may be provided in a transparent or highly translucent colors. Typical means of manufacture of the container is injection molding of the polymeric plastic into the tubular or spherical container. The walls of the configurations, color and design may be integrally molded in. In addition, the tube may be molded after which suitable color, design may be painted on the outside or the inside of the tube as desired.

It is preferred that the tubular container be a hollow cylinder with an integral rounded front wall closure, generally in the shape of a test tube. It is also preferred that the continuous side wall of the tubular container be molded in a fish shaped hollow molding. It is preferred that the rear opening be closed by a closure member that snugly interfits into that opening. As will be described herein below, mating holes through the side wall and through the snug fitting closure will allow the leader to train through the mated holes and hold the closure member in place. Another preferred embodiment includes the rear opening being circular and being equipped with threads with the rear closure member also being circular and equipped with mating threads to engage and hold the rear closure device in position.

It is preferred that a plurality of holes be provided through the side walls. The holes are in addition to the front hole and the rear hole described herein above. It is further preferred that of the plurality of holes through the side wall will be at least one pair of holes through the side wall that are aligned along the length of the side wall in a line proximate to parallel to the longitudinal center line of the tubular container. With this pair of side holes, one end of a leader line is attached to a long line to the reel and the other end is trained in through the front hole, out through the closest side wall holes (closest to the front wall), in through the other side wall hole of the same pair (closest to the rear of the container) and finally out through the hole through the rear closure member. In this configuration, there is leader line trained along the outside surface of the side wall and one or more hooks or other lures may be attached to that leader trained along the outside of the fishing lure. In addition, one or more hooks can be attached to the leader that extends out through the rear closure member. It is further preferred that there be at least two pair of holes along the side wall to provide additional water flow through the container to provide oxygen to the bait inside the container, water enters and leaves the container through the holes even if they are partially filled with the leader trained through the holes, but it is preferred to have additional holes for water to flow in and out of as the lure is traveling through the water or water is flowing past the lure.

It should be understood that the term "tubular" is not intended to be limiting as the shape of the tubular container may be cylindrical or the cross-section of the tubular may be eliptical or of any other convenient shape so long as it provides sufficient interior volume to house the live bait and does not unduly interfere with viewing the live bait from the outside. In particular, the term "tubular" includes various molded shapes of a generally tubular structure such as a fish shape or other bait shape structures.

In the spherical configuration of the present invention, it is preferred that the container be a spherical ball constructed of transparent polymeric plastic. Again, the degree of translucency and color of the ball should allow the interior of the ball to be viewed by the game fish. The ball, in the same fashion as the tubular container is fillable with water and live bait. A closure device is preferably provided including two mating spherical halves having threads integrally molded into the abutting edges to threadably engage and close the sphere. A multiplicity of holes through the wall of the spherical container is provided of sufficient size to allow free flow of water through the container, but small enough to prevent escape of the live bait.

In FIG. 1, spherical fish lure 20 is trained behind boat 22 by connection with line 24 which is connected to float 26, which in turn is connected with the boat line 28. Tubular fish lure 30 is connected to line 32 which trails from rod and reel 34. Both fish lures 20 and 30 are positioned below the surface of the water to attract and ultimately catch fish 36.

Figure 2:
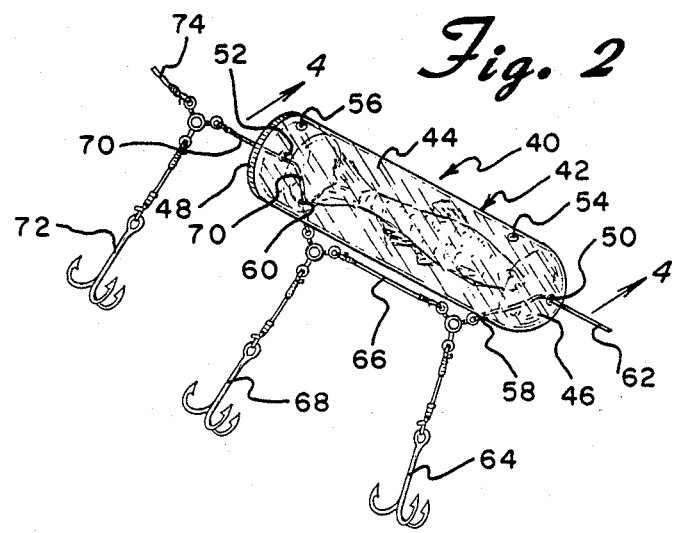
FIG. 2 is a perspective view of an embodiment of the present invention.
Figure 3:
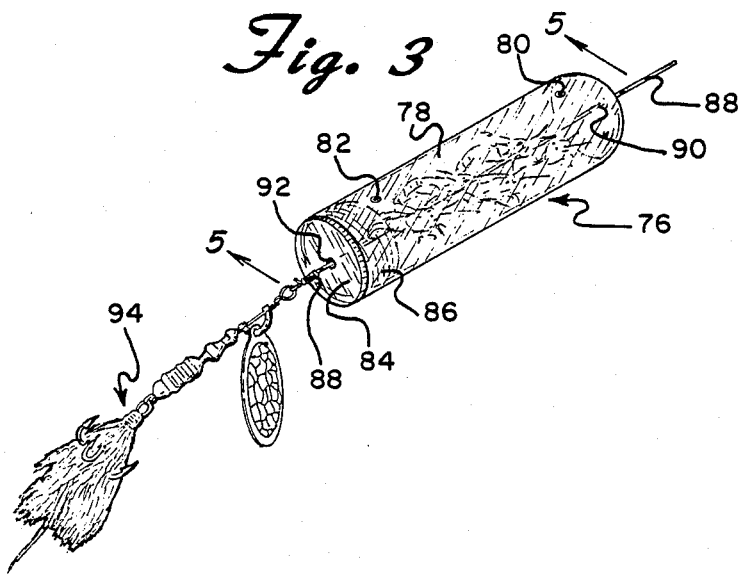
FIG. 3 is a perspective view of a second embodiment of the present invention.

In FIG. 2, fish lure 40 is similar to fish lure 20 but employs a different hook and leader configuration. Lure 40 includes tubular container 42 which is integrally constructed of continuous side wall 44 essentially in a cylindrical shape and front curved closure wall 46. Tubular container 42 approximates the shape of a test tube. Rear closure 48 is a separate molded force fitted closure plug typically of resilient polymeric plastic such a polyethylene, polypropylene, and synthetic rubber. It is preferred that it be molded of a semi-rigid thermoplastic polymer such as polyethylene. Tubular container 42 has front hole 50 located in the center of front wall 46 and located proximate to the center line of container 42. Rear hole 52 is located in the center of rear closure 48 and is also located proximate to the center line of container 42. Additional holes are provided in side wall 44 including a first pair of holes 54 and 56. Hole 54 is located toward the front of container 42 closest to front wall 46. Hole 56 is located closest to the rear of container 42 and matches up with a complimentary hole through the side wall of rear closure 48 so that interior of container 42 is opened to the outside through these holes including hole 56. A second pair of holes, again located through side wall 44 are holes 58 and 60, both partially hidden in this view. Again, the pair of holes 58 and 60 are located generally in an alignment parallel to the center line of container 42 although it is not necessary that they be exactly in alignment. Hole 58 is located near front wall 46 and hole 60 is located closest to rear closure 68 and again matches with a hole through the side wall of rear closure 48 opening the interior of container 42 to the outside. Leader 62 attached to a line to a rod and reel extends through hole 50 into the interior of tubular container 42 and out through hole 58. In this length near hole 58, as illustrated, treble hook 64 is attached with a short branch leader. Line 66 continues from that connection and extends along the outside wall of side wall 44 to a point proximate that of rear side hole 60 at which point treble hook 68 is attached with a second short branch leader. Leader line 70 is connected to the treble hook connection and then is trained in through hole 60 back into the interior of tubular container 42 and is trained out through hole 52 in rear closure 48 at which point treble hook 72 is attached. Live 74 is attached at this point and continues rearwardly where additional hooks and/or luring devices may be attached. Although each attachment of the line segments is shown tied, it should be clear that spring clips will facilitate the attachment and removal of hooks and lines at any juncture. Further the line may continue in and out of the holes with hooks or branching leaders merely being tied on. Further as line 70 passes through hole 60, rear closure 48 is held in position so that it cannot inadvertently be dislodged and lost from tubular container 42.

Fish lure 76 is another embodiment of fish lures 30 and 40 and includes tubular container 78 which is approximately the same shape as tubular container 42. Side holes 80 and 82 are provided to facilitate water flow into and out of container 78. Rear closure 84 engages the rear of tubular container 78 with complimentary threads 86 which are molded into the outside wall of rear closure 84 and interfit with threads molded into the inside wall of tubular container 78. Leader line 88 extends through front hole 90 (partially hidden) and continues through the interior of container 78 and is trained out through hole 92 in rear closure 84. Spinner lure 94 with a treble hook is attached to the rearward end of line 88.

FIG. 4 being a cross-sectional view of tubular container 42 illustrates the configuration of the holes and line trained through and out of tubular container 42 which contains the live bait, in this case, minnow 96. Resilient cylindrical wall 98 of rear closure 48 is forced fitted into the rear opening of container 42 matching and aligning hole 100 with hole 56 and hole 102 with hole 60 allowing line 70 to train through the complementary holes to interlock the parts together as well as providing water flow in and out of container 42.

In FIG. 5, the cross-sectional view shows cylindrical container 78 housing baby shrimp bait 104 and line 88 trained through front hole 90 and out rear hole 92. With this kind of bait, the intrusion of line 88 through the center of container 78 poses no problem. Rear closure 84 with threads 86 engage thread 106 at the rear open end of tube 78. Additional holes 108 and 110 are provided through the side wall of tubular container 78 to facilitate water flow in and out of the interior to aid in saving the bait.

In FIG. 6, fish lure is illustrated as very similar to that of fish lure 40 and 78 except that tubular container 114 is tinted a color sufficient to attract the fish but also light enough in intensity to still allow bait fish 115 to be seen through the side wall of the container. A design in the form of an eye 116 is painted on the outside of tube 114. Leader line 118 extends through a middle front hole and directly through to connect with single hook 120 outside rear closure 119. A piece of pork rind or colored flexible plastic material may be fixed to hook 120 to further attract the game fish.

In FIG. 7, fish lure 122 is constructed of transparent hollow sphere 124 formed of upper half 126 and lower half 128 with a plurality of holes 130 to open the interior of sphere 124 to the outside. Hole 132 provides attachment of a cord through the hole and to the boat or dock to which the game fish are to be attracted.

In FIG. 8, the connection of upper half 126 with lower half 128 is illustrated by engagement of screw thread 134 in upper half 126 and screw threads 136 in lower half 128. Bait fish 138 cannot escape spherical container 124, but are provided sufficient water and air flow through holes 130 to be safe from game fish, but yet are there to attract them to the area.

In FIG. 9, the use of fish lure 122 is illustrated connected through cord 140 to dock 142 providing safe storage of the bait until use, and attracting game fish right to the dock.

In FIG. 10, fish lure 144 is another embodiment of the invention illustrating a preferred tubular shape being formed in the general shape of a fish. In this cross-sectional view, the tubular shape is constructed into two separate parts, front part 146 and a rear part 144 which interfit and snap fit together to house bait fish 150. Front hole 152 and rear hole 154 are again positioned close to the center line of the tubular construction. Side wall holes 156 provide holes for training the leader line around the bait fish to attach additional hooks and provide water flow to the container.

The side walls of the fish lures typically constructed with a thickness of about 1/16 inch although that may vary considerably depending upon the size and particulate shape employed. The holes in the fish lure may vary in size from 1/32 inch to ¼ inch and preferably 1/32 inch to 3/32 inch and most preferably about 1/16 inch diameter.

Typical bait that may be used in the fishing lure of this invention, includes not only that bait pictured, but cut bait, live frogs, live eels, live shrimp, live craw fish, live crabs, corn dough balls, live worms, salmon eggs, and various type of bait fish including shiners, minnows and the like. Various types of hook arrangements may be attached to the fishing lure of this invention including as examples but without limitation, a single hook may be attached to the rear; a treble hook may be attached to the rear, two treble hooks may be attached to the side with a treble hook attached to the rear, a spoon or spinner lure with a treble hook, with or without living decorations may be attached to the rear; live bait fish may be attached to the rear; plastic worms and synthetic live baits may be attached to the rear; a spoon or spinne lure may be attached to the front aligned just before the leader enters the front hole; a single treble hook may be attached to the side with a single treble hook to the rear; stick-on or painted eyes may be affixed to the outside surface; colored lines and other designs may be painted on the outside of the tubular structure; a spoon with a treble hook may be attached to the rear; a separate lure including a moving body may be attached to the rear; jigs or spinners may be attached to the rear and any combination may be made of these. Various colors including colored strips may be painted on the outside of the tubular container with particular colors including red, yellow, blue, black, orange, green and any fluorescent colors. It is clear that many patterns and configurations may be added to the fish lure and any number of various combinations of hooks and additional luring devices may be attached in front of or the side of on, in back of the fishing lure of this invention.

While this invention has been described with reference to the specific embodiments disclosed herein, it is not confined to the details set forth and the patent is intended to include modifications and changes which may come within and extend from the following claims.

I claim:
1. A fishing lure comprising:
(a) a tubular shaped container having a continuous side wall, a closed front wall, and a rear opening, wherein the container is constructed of a material that is sufficiently translucent that the interior of the container can be viewed from the outside,
(b) a detachable rear closure member to detachably close the rear opening, and
(c) a plurality of holes through the combination of the container and the rear closure member comprising a first hole through the center of the front wall, a second hole through the center of the rear closure member, the first and second holes being positioned proximate to the longitudinal center line of the tubular shaped container, and a plurality of lengthwise aligned holes through the side wall, wherein the positions of the holes are sufficient to allow training a leader in through the first hole, out and in through the aligned side wall holes leaving the interior of the container essentially unobstructed, and out through the second hole, and wherein the size of the holes are sufficient to fill the container with water when immersed and retain most of the water when the container is cast into a body of water.

2. The fishing lure of claim 1 wherein the side wall is transparent.

3. The fishing lure of claim 1 wherein the side wall is polymeric plastic.

4. The fishing lure of claim 1 wherein the tubular container is a cylinder with an integral rounded front wall.

5. The fishing lure of claim 1 wherein the continuous side wall of the tubular container is a fish shaped hollow molding.

6. The fishing lure of claim 1 wherein the rear closure member interfits into the rear opening snugly.

7. The fishing lure of claim 6 wherein at least one hole through the container side wall is positioned to align with a hole through the rear closure member.

8. The fishing lure of claim 1 wherein the rear opening is circular and equipped with threads, and the rear closure member is circular and is equipped with threads that enage the threads of the rear opening.

9. The fishing lure of claim 1 wherein at least one pair of holes through the side wall are aligned along the length of the side wall proximately parallel to the longitudinal center line of the tubular container.

10. The fishing lure of claim 9 which further comprises a leader line with one end attachable to a long line to a reel and the other end is trained into the container through the front hole, out through one of the holes in the side wall closest to the front wall, in through the other hole of the pair closest to the rear of the container and out through the hole through the rear closure member.

11. The fishing lure of claim 10 wherein the leader line trained along the outside of the side wall is attached to at least one hook and the leader line training out through the closure member is attached to at least one hook.

12. The fishing lure of claim 1 wherein the number and size of the holes through the combination of the container and the rear closure member are chosen to retain most of the water in the container when it is cast into the water so that when that the lure hits water, it will still contain a substantial quantity of water.

13. A fishing lure comprising:

(a) a tubular shaped container having a continuous side wall, a closed front wall, and a rear opening, wherein the container is constructed of a material that is sufficiently translucent that the interior of the container can be viewed from the outside, (b) a detachable rear closure member to detachably close the rear opening (c) a plurality of holes through the combination of the container and the rear closure member comprising a first hole through the center of the front wall, a second hole through the center of the rear closure member, the first and second holes being positioned proximate to the longitudinal center line of the tubular shaped container, and a plurality of holes through the side wall, wherein at least one pair of holes through the side wall are aligned along the length of the side wall proximately parallel to the longitudinal center line of the tubular container, and (d) a leader line with one end attachable to a long line to a reel and the other end is trained into the container through the front hole, out through one of the holes in the side wall closest to the front wall, in through the other hole of the pair closest to the rear of the container and out through the hole through the rear closure member, wherein the leader line trained along the outside of the side wall is attached to at least one hook and the leader line training out through the closure member is attached to at least one hook.

* * * * *